United States Patent
Le Dortz et al.

(10) Patent No.: US 11,272,156 B2
(45) Date of Patent: Mar. 8, 2022

(54) SPATIAL CORRELATION SAMPLING IN TIME-OF-FLIGHT IMAGING

(71) Applicant: Analog Devices International Unlimited Company, Limerick (IE)

(72) Inventors: Nicolas Le Dortz, Cambridge, MA (US); Jonathan Ephraim David Hurwitz, Edinburgh (GB); Erik D. Barnes, Cambridge, MA (US)

(73) Assignee: ANALOG DEVICES INTERNATIONAL UNLIMITED COMPANY, Limerick (IE)

(*) Notice: Subject to any disclaimer, the term of this patent is extended or adjusted under 35 U.S.C. 154(b) by 0 days.

(21) Appl. No.: 16/742,898

(22) Filed: Jan. 14, 2020

(65) Prior Publication Data

US 2020/0264310 A1    Aug. 20, 2020

Related U.S. Application Data

(60) Provisional application No. 62/806,595, filed on Feb. 15, 2019, provisional application No. 62/806,561, (Continued)

(51) Int. Cl.
| | |
|---|---|
| *H04N 13/128* | (2018.01) |
| *H04N 13/254* | (2018.01) |
| *G01S 7/4863* | (2020.01) |
| *G01S 17/894* | (2020.01) |
| *G01S 17/10* | (2020.01) |
| *G01S 17/32* | (2020.01) |
| *H04N 5/225* | (2006.01) |

(Continued)

(52) U.S. Cl.
CPC ....... *H04N 13/128* (2018.05); *G01S 7/4863* (2013.01); *G01S 7/4915* (2013.01); *G01S 17/10* (2013.01); *G01S 17/32* (2013.01); *G01S 17/894* (2020.01); *H04N 5/2256* (2013.01); *H04N 5/23245* (2013.01); *H04N 13/254* (2018.05); *H04N 2013/0081* (2013.01)

(58) Field of Classification Search
CPC ...... G01S 17/894; G01S 17/32; G01S 7/4915; H04N 5/2256
See application file for complete search history.

(56) References Cited

U.S. PATENT DOCUMENTS

| | | |
|---|---|---|
| 8,786,678 B2 | 7/2014 | Schmidt et al. |
| 9,325,920 B2 | 4/2016 | Van Nieuwenhove et al. |
| | (Continued) | |

FOREIGN PATENT DOCUMENTS

CN    104849720    8/2015

OTHER PUBLICATIONS

EN Google Translate of Description, Claims and Abstract of CN104849720 (see 5 below)

*Primary Examiner* — Nasim N Nirjhar
(74) *Attorney, Agent, or Firm* — Patent Capital Group

(57) ABSTRACT

Time of Flight (ToF) image processing methods include collecting correlation samples to calculate a phase estimate. Systems and methods are provided for collecting correlation samples from multiple pixels. An image processing system for continuous waves includes a light source configured to emit light, an image sensor having a plurality of pixels, and a processor configured to collect correlation samples from a subset of the plurality of pixels in the image sensor.

20 Claims, 13 Drawing Sheets

Related U.S. Application Data filed on Feb. 15, 2019, provisional application No. 62/806,722, filed on Feb. 15, 2019.

(51) Int. Cl.
  *H04N 5/232* (2006.01)
  *G01S 7/4915* (2020.01)
  *H04N 13/00* (2018.01)

(56) References Cited

U.S. PATENT DOCUMENTS

| | | | |
|---|---|---|---|
| 9,874,630 | B2 | 1/2018 | Hall et al. |
| 10,191,154 | B2 | 1/2019 | Kadambi et al. |
| 2006/0209631 | A1* | 9/2006 | Melese .................. G01H 9/002 367/7 |
| 2012/0013887 | A1 | 1/2012 | Xu et al. |
| 2013/0144137 | A1* | 6/2013 | Zalevsky ............. A61B 5/1459 600/314 |
| 2014/0002636 | A1 | 1/2014 | Lee et al. |
| 2015/0304534 | A1* | 10/2015 | Kadambi ............... G01S 17/894 348/207.11 |
| 2016/0055400 | A1 | 2/2016 | Jorquera et al. |
| 2016/0071275 | A1* | 3/2016 | Hirvonen .................. G06K 9/56 382/103 |
| 2016/0086318 | A1* | 3/2016 | Hannuksela ............ G01S 17/89 348/43 |
| 2016/0161611 | A1 | 6/2016 | Ito et al. |
| 2016/0223656 | A1 | 8/2016 | Hall et al. |
| 2017/0205497 | A1 | 7/2017 | Dorrington et al. |
| 2018/0067197 | A1* | 3/2018 | Schockaert ............. G01S 17/36 |
| 2019/0018119 | A1* | 1/2019 | Laifenfeld ............. G01S 7/497 |
| 2019/0046302 | A1 | 2/2019 | Li et al. |
| 2019/0109977 | A1 | 4/2019 | Dutton et al. |
| 2019/0113605 | A1 | 4/2019 | Liobe et al. |
| 2019/0386744 | A1* | 12/2019 | Plank .................. H04B 10/1143 |
| 2020/0021792 | A1 | 1/2020 | Amaya-Benitez et al. |
| 2020/0066779 | A1 | 2/2020 | Dutton |
| 2020/0125822 | A1 | 4/2020 | Yang et al. |
| 2020/0249348 | A1 | 8/2020 | Mathy |
| 2020/0264311 | A1 | 8/2020 | Le Dortz et al. |
| 2020/0267367 | A1 | 8/2020 | Le Dortz et al. |

* cited by examiner

SPATIAL CORRELATION SAMPLING IN TIME-OF-FLIGHT IMAGING

RELATED APPLICATIONS

This application claims priority to U.S. Patent Application Ser. No. 62/806,561 filed Feb. 15, 2019 entitled "Spatial Correlation Sampling in Time-of-Flight Imaging", U.S. Patent Application Ser. No. 62/806,595 filed Feb. 15, 2019 entitled "Time-of-Flight Camera and Proximity Detector", and U.S. Patent Application Ser. No. 62/806,722 filed Feb. 15, 2019 entitled "Depth Non-Linearity Compensation in Time-of-Flight Imaging", which are hereby incorporated by reference in their entirety. Additionally, this application is related to U.S. Patent Application entitled "Time-of-Flight Camera and Proximity Detector" filed on Jan. 14, 2020, and U.S. Patent Application entitled "Depth Non-Linearity Compensation in Time-of-Flight Imaging" filed on Jan. 14, 2020, which are hereby incorporated by reference in their entirety.

FIELD OF THE DISCLOSURE

The present disclosure pertains to time of flight (ToF) imaging. More specifically, this disclosure describes systems and techniques relating to spatial correlation sampling in ToF imaging.

BACKGROUND

Time of flight (ToF) is a property of an object, particle or acoustic, electromagnetic or other wave. It is the time that such an object needs to travel a distance through a medium. The measurement of this time (i.e. the time of flight) can be used for a time standard (such as an atomic fountain), as a way to measure velocity or path length through a given medium, or as a way to learn about the particle or medium (such as composition or flow rate). The traveling object may be detected directly (e.g., ion detector in mass spectrometry) or indirectly (e.g., light scattered from an object in laser doppler velocimetry).

The Time-of-Flight principle (ToF) is a method for measuring the distance between a sensor and an object based on the time difference between the emission of a signal and its return to the sensor after being reflected by an object. Various types of signals (also called carriers) can be used with ToF, the most common being sound and light. Some sensors use infrared light as their carrier because it is uniquely able to combine speed, range, low weight and eye-safety. Infrared light can ensure less signal disturbance and easier distinction from natural ambient light resulting in the higher performing sensors for a given size and weight.

A time-of-flight camera (ToF camera) is a range imaging camera system that resolves distance based on the known speed of light, measuring the time-of-flight of a light signal between the camera and the subject for each point of the image.

In time-of-flight (ToF) cameras, the image sensor captures a two-dimensional image, or several two-dimensional images, from which a processor can determine the distance to objects in the scene. The TOF camera is further equipped with a light source that illuminates objects whose distances from the device are to be measured by detecting the time it takes the emitted light to return to the image sensor. The system may also utilize image processing techniques.

Time of Flight (ToF) depth image processing methods include collecting correlation samples to calculate a phase estimate. The correlation samples are collected at sequential time points.

A depth camera is a camera where each pixel outputs the distance between the camera and the scene. One technique to measure depth is to calculate the time it takes for the light to travel from a light source on the camera to a reflective surface and back to the camera. This travel time is commonly referred as time of flight.

SUMMARY OF THE DISCLOSURE

Time of Flight (ToF) depth image processing methods include collecting correlation samples to calculate a phase estimate. Systems and methods are provided for collecting correlation samples from multiple pixels. An image processing system for continuous waves includes a light source configured to emit light during a first time interval, an image sensor having a plurality of pixels, and a processor configured to collect correlation samples from a subset of the plurality of pixels in the image sensor.

According to one aspect, an image processing system for estimating a phase of continuous waves, includes a light source configured to emit light during a first time interval, an sensor array comprising a plurality of pixels for receiving reflected emitted light, and a processor configured to collect a plurality of spatial correlation samples simultaneously from at least a subset of the plurality of pixels, and determine the phase based on a subset of the plurality of spatial correlation samples.

According to some implementations, the image processing system includes a signal generation circuit for generating a modulating signal for modulating intensity of the light emitted from the light source. In some implementations, the plurality of pixels is configured to demodulate the reflected emitted light. In some implementations, respective pixels of the plurality of pixels are configured to determine phase offset of the reflected emitted light.

In some implementations, the image processing system includes a readout circuit configured to read out pixel values for respective ones of the plurality of pixels. In some implementations, pixel values comprise sampled correlation function values for respective pixels of the plurality of pixels. In some implementations, the image processing system includes a data buffer for storing pixel values. In some implementations, the subset of the plurality of spatial correlation samples correspond to a two-by-two sub-array of the plurality of pixels. In some implementations, the subset of the plurality of spatial correlation samples correspond to a three-by-three sub-array of the plurality of pixels.

According to one aspect, a method for estimating a phase of continuous waves in an image processing system includes emitting light from a light source during a first time interval, receiving reflected emitted light at a sensor array comprising a plurality of pixels, collecting a plurality of spatial correlation samples from at least a subset of the plurality of pixels, and determining the phase based on a subset of the plurality of spatial correlation samples.

According to some implementations, the method includes generating a modulating signal for modulating intensity of the light emitted from the light source. In some implementations, the method includes demodulating the reflected emitted light. In some implementations, the method includes determining phase offset of the reflected emitted light at respective pixels of the plurality of pixels. In some implementations, the method includes outputting pixel values for respective ones of the plurality of pixels to a readout circuit. In some implementations, pixel values comprise sampled spatial correlation function values for respective pixels of the plurality of pixels. In some implementations outputting pixel values occurs during a second time interval, wherein during the second time interval the light source is deactivated.

According to another aspect, a camera apparatus for estimating a phase of continuous waves, includes a light source configured to emit light, an sensor array comprising a plurality of pixels for receiving reflected emitted light, means for collecting a plurality of spatial correlation samples simultaneously from at least a subset of the plurality of pixels, and means for determining the phase based on a subset of the plurality of spatial correlation samples.

According to some implementations, the camera apparatus includes a signal generation circuit for generating a modulating signal for modulating intensity of the light emitted from the light source. In some implementations, respective pixels of the plurality of pixels are configured to determine phase offset of the reflected emitted light. According to some implementations, the camera apparatus includes a readout circuit configured to read out pixel values for respective ones of the plurality of pixels.

The drawings show exemplary ToF circuits, systems and configurations. Variations of these systems, for example, changing the positions of, adding, or removing certain elements from the circuits are not beyond the scope of the present invention. The illustrated ToF devices and configurations are intended to be complementary to the support found in the detailed description.

Further limitations and disadvantages of conventional and traditional approaches will become apparent to one of skill in the art, through comparison of such systems with some aspects of the present invention as set forth in the remainder of the present application with reference to the drawings.

BRIEF DESCRIPTION OF THE DRAWINGS

For a fuller understanding of the nature and advantages of the present invention, reference is made to the following detailed description of preferred embodiments and in connection with the accompanying drawings, in which.

DETAILED DESCRIPTION

The present disclosure pertains to time of flight (ToF) depth imaging. More specifically, this disclosure describes systems and techniques relating to continuous wave ToF imaging. ToF Depth image processing methods estimating the phase of received signals. In various implementations, correlation samples are collected and used to determine signal phase. Conventional methods include collecting correlation samples over time for phase determination. The present disclosure provides systems and methods for determining phase from correlation samples collected at a single time point from multiple pixels. An image processing system for continuous waves includes a light source configured to emit light during a first time interval, an image sensor having a plurality of pixels, and a processor configured to collect correlation samples from a subset of the plurality of pixels in the image sensor.

A depth camera is a camera where each pixel outputs the distance between the camera and the scene. One technique to measure depth is to calculate the time it takes for the light to travel from a light source on the camera to a reflective surface and back to the camera. This travel time is commonly referred as time of flight. One goal of a time-of-flight camera is to estimate the delay between the emitted signal and the return signal.

Figure 1A:
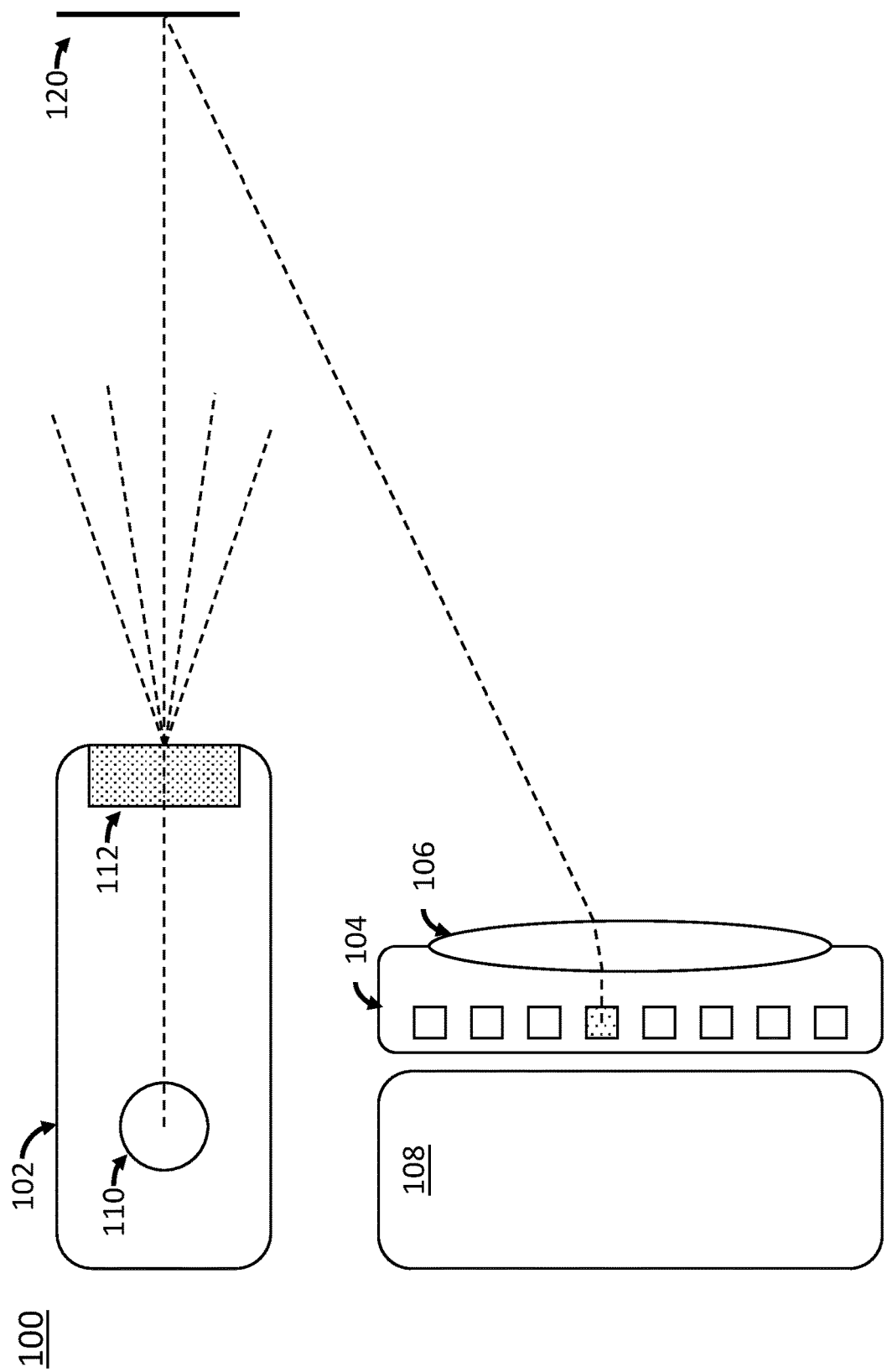
FIG. 1A shows an imaging device, according to some embodiments of the disclosure.

According to one implementation, as shown in FIG. 1A, a ToF camera includes a light source 102, a pixel array 104, a lens 106, and a processing unit 108. The light source 102 includes a light emitter 110 and a diffuser 112. Light from the light emitter 110 is projected to the diffuser 112, and the light source 102 thereby emits a beam of light with a certain divergence to illuminate the scene in front of the camera. The light source 102 modulates the intensity of the light. In some examples, the light source 102 emits light in the near infrared domain (typically about 850 nm or about 940 nm wavelength).

The pixel array 104 is a sensor and has a size H×W. The pixel array 104 collects the returning reflected light from the scene 120. As shown in FIG. 1A, the lens 106 focuses the returning reflected light on the pixel array 104. The pixel array 104 outputs collected light values for each pixel to the processing unit 108. The processing unit 108 processes the pixel values and outputs depth. In one example, the pixel values are voltages proportional to the amount of charge stored at each pixel. In one example, a readout circuit receives the pixel values and converts the pixel values from analog to digital values, and transmits the digital values to the processing unit 108.

Figure 1B:
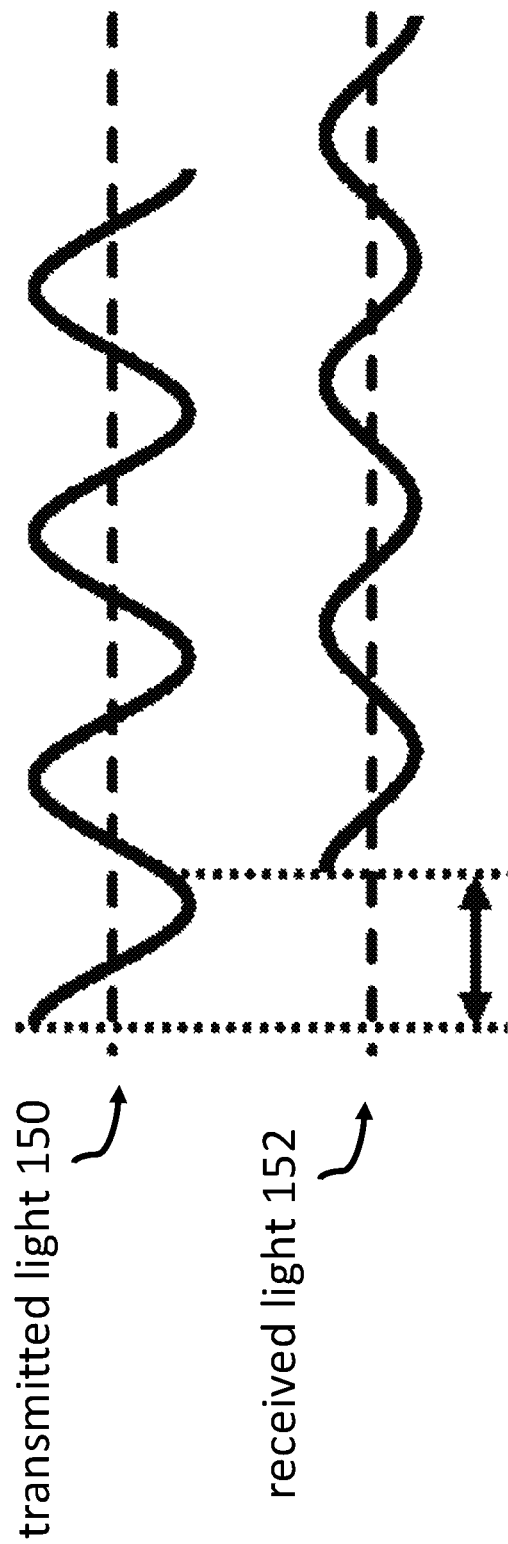
FIG. 1B shows transmitted and received waves, according to some embodiments of the disclosure.

Indirect time-of-flight measurements can be determined using continuous wave modulation. As shown in FIG. 1B, there is a phase offset between the transmitted light 150 from the light source, and the received light 152 at the pixel array 104.

According to various implementations, there are multiple approaches to modulating light. According to one mode, a simple approach is to use a continuous wave modulation, for example a sinusoidal modulation where the emitted signal is represented by equation (1):

$$s(t) = A_s \cos(2\pi f t) + B_s \quad (1)$$

where $A_s$ is the amplitude of the signal, $B_s$ is the offset of the signal, and f is the modulation frequency, $$f = \frac{1}{T}$$

where T is the modulation period.

The received signal r(t) is a delayed and attenuated version of the emitted signal, as shown in equation (2):

$$r(t) = \alpha s(t - \Delta) \quad (2)$$

Where $0 \leq \alpha < 1$ is an attenuation coefficient that depends on distance and surface reflectivity, and $\Delta$ is the delay of the return signal. The delay is proportional to the distance d such that $$\Delta = \frac{2d}{c}$$

(where c is the speed of light).

According to various implementations, the goal of a time-of-flight camera is to estimate the delay $\Delta$ between the emitted signal and the return signal.

Figure 2:
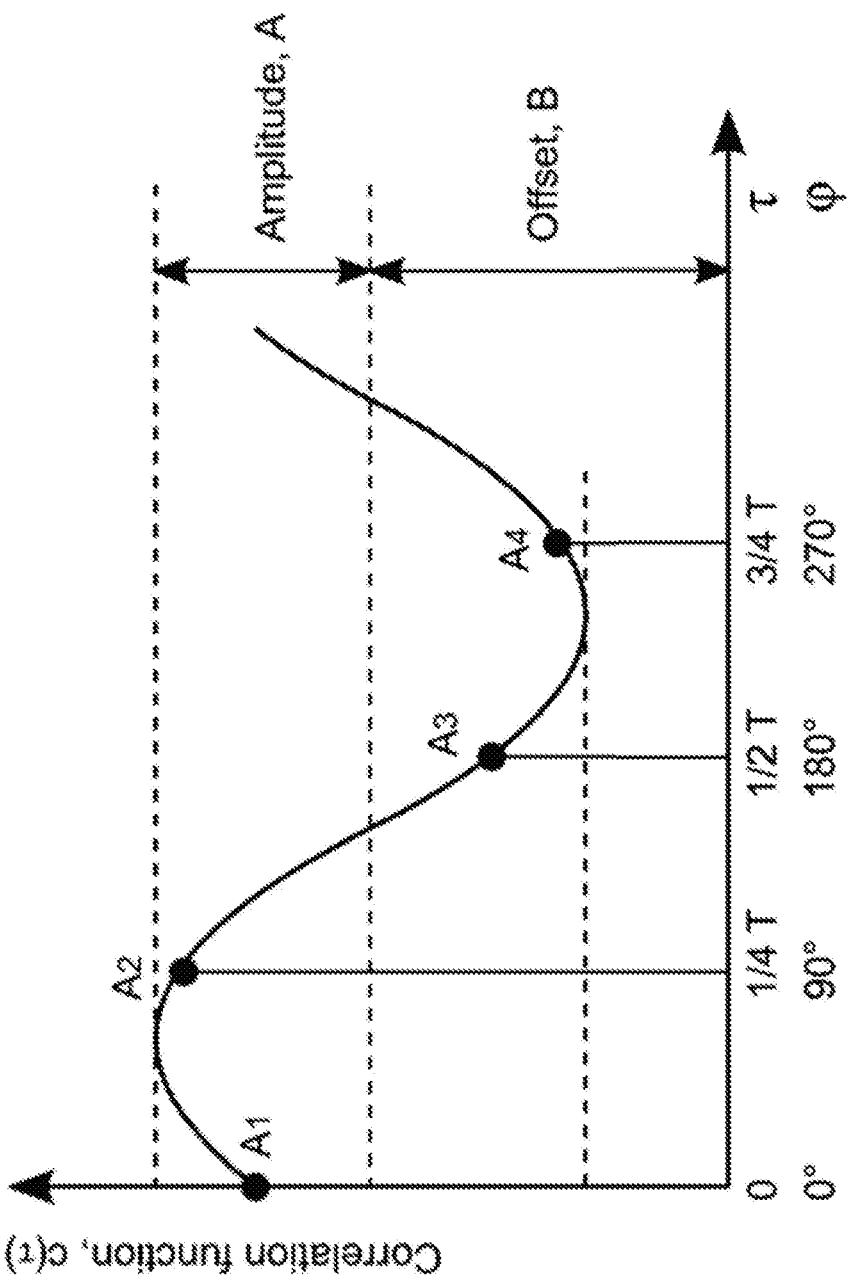
FIG. 2 shows an example of the correlation function sampling process, according to some embodiments of the disclosure.

Continuous-wave time of flight sensors measure the distance at each pixel by sampling the correlation function between the received signal r(t) and a demodulating signal g(t) with the same frequency as s(t) (for example, as shown in FIG. 2). In various implementations, the demodulating signal is also a sinewave, as shown in equation (3):

$$g(t) = A_g \cos(2\pi f_{mod} t) + B_g \quad (3)$$

The operation performed at the pixel is a correlation operation, as shown in equation (4):

$$c(\tau) = \int_0^{NT} r(t) g(t - \tau) dt \quad (4)$$

where NT is the integration time, and N is the number of cycles over which the correlation is calculated.

When both the emitted signal and the demodulating signal are sinewaves, the correlation value $c(\tau)$ as a function of the delay $\tau$ applied to the demodulating signal is given by equation (5):

$$c(\tau) = A \cos(2\pi f(\Delta - \tau)) + B \quad (5)$$

where $A = A_g A_s \alpha$ and $B = \alpha B_g B_s$.

The phase offset $\Phi = 2\pi f \Delta$ is proportional to depth. The phase offset $\Phi$ between the emitted signal and the demodulating signal can be estimated with the following formula shown in equation (6):

$$\Phi = \operatorname{atan}\left(\frac{c\left(\frac{T}{4}\right) - c\left(\frac{3T}{4}\right)}{c(0) - c\left(\frac{T}{2}\right)}\right) \quad (6)$$

FIG. 2 shows an example 200 of the correlation function sampling process, according to various embodiments of the disclosure.

An intensity estimate can be calculated using the following equation (7):

$$I = \sqrt{\left(c(0) - c\left(\frac{T}{2}\right)\right)^2 + \left(c\left(\frac{T}{4}\right) - c\left(\frac{3T}{4}\right)\right)^2} \quad (7)$$

In some examples, the correlation function is sampled in a single-ended operation. In some examples, the correlation function is sampled in a differential operation. In the single-ended operation, the pixel measures the correlation value $c(\tau)$ directly. In the differential operation, the pixel measures a differential correlation value:

$$c(\tau) - c\left(\tau - \frac{T}{2}\right).$$

Thus, four single-ended measurements are used to estimate the delay $\Delta$. Two differential measurements are sufficient to estimate the delay $\Delta$. A correlation sample is measured using two phases: an exposure phase and a readout phase. The exposure phase is the phase during which the laser emits light and the pixel demodulates the return light. The readout phase is the phase during which the pixel values are read out of the sensor chip.

Figure 3:
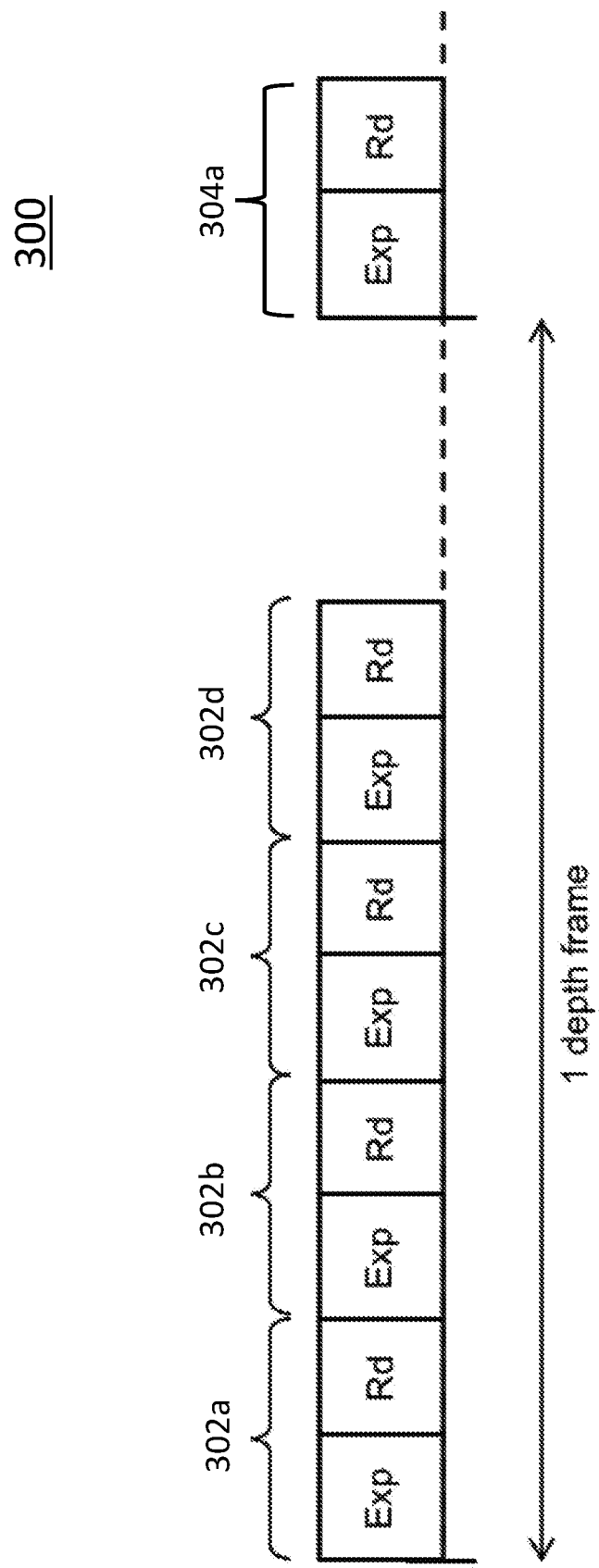
FIG. 3 shows a timing diagram of a sensor operation, according to some embodiments of the disclosure.

An example timing chart of the operation is shown in FIG. 3. In particular, FIG. 3 shows a timing diagram of a sensor operation. In various examples, there are multiple exposure and readout phases in a depth frame. As shown in FIG. 3, there are four consecutive exposure and readout phases 302a, 302b, 302c, 302d in a first depth frame, followed by more phases that are not shown. In various implementations, there is some idle time after the last exposure/readout phase of a depth frame before a new frame 304a starts.

According to various implementations, reducing the number of exposure/readout phases reduces energy consumption of the imager. In particular, emitting light and demodulating the return signal during the exposure phase consumes energy. As the distance to the target object (the object being imaged) increases, energy use increases, since more light is emitted to observe enough reflected return photons on the sensor. Additionally, reading the data out of the sensor consumes energy. Furthermore, elements in the scene can move during the capture of a depth frame. Similarly, the camera can move during the capture of a depth frame. Reducing the number of exposure/readout phases reduces the difference in the measured image between the measurements of two correlation samples.

It is therefore more efficient to have a sensor that collects differential correlation measurements than a sensor that measures single-ended correlation measurements.

According to various implementations, the phase offset 1 is estimated modulo $2\pi$ due to the periodicity of the correlation function, which means that the time-of-flight $\Delta$ is estimated modulo T. This creates an ambiguity in the depth estimation. For example, at a modulation frequency of 200 MHz, an object at 10 cm will yield the same depth estimate as an object at 85 cm (depth uncertainty of 75 cm). One way to disambiguate the depth measurement is to repeat the phase offset estimation for different modulation frequencies. This ambiguity is typically removed by repeating the phase offset estimation with different modulation frequencies (typically 2 or 3 frequencies), which has the adverse effect of multiplying the number of exposure/readout phases.

Harmonic Cancellation in Non-Ideal Mode of Operation

In practice, the emitted signal s(t) and the demodulating signal g(t) are not pure sinewaves—the emitted signal and demodulating signal contain harmonics. The harmonics can stem from the non-linearity of the demodulation operation or light emission process, or from the fact the signals are generated from square waves.

When harmonics are present, the correlation function can contain terms at frequencies multiple of the modulation frequency. For example, the correlation function can be of the form:

$$c(\tau) = B + A_1 \cos(2\pi f(\Delta - \tau)) + A_2 \cos(4\pi f(\Delta - \tau)) + A_3 \cos(6\pi f(\Delta - \tau)) + \quad (8)$$

where $A_1, A_2, A_3, \ldots$ represent the amplitude of each harmonic component. This formula does not represent the most general expression of the correlation function as each harmonic can also have a different phase. The formula is an illustration of the problem.

The harmonics in the correlation function cause errors in the phase offset estimates, which in turn lead to depth errors. A representation of the phase estimate as a function of depth with and without harmonics is shown in FIG. 4.

Figure 4:
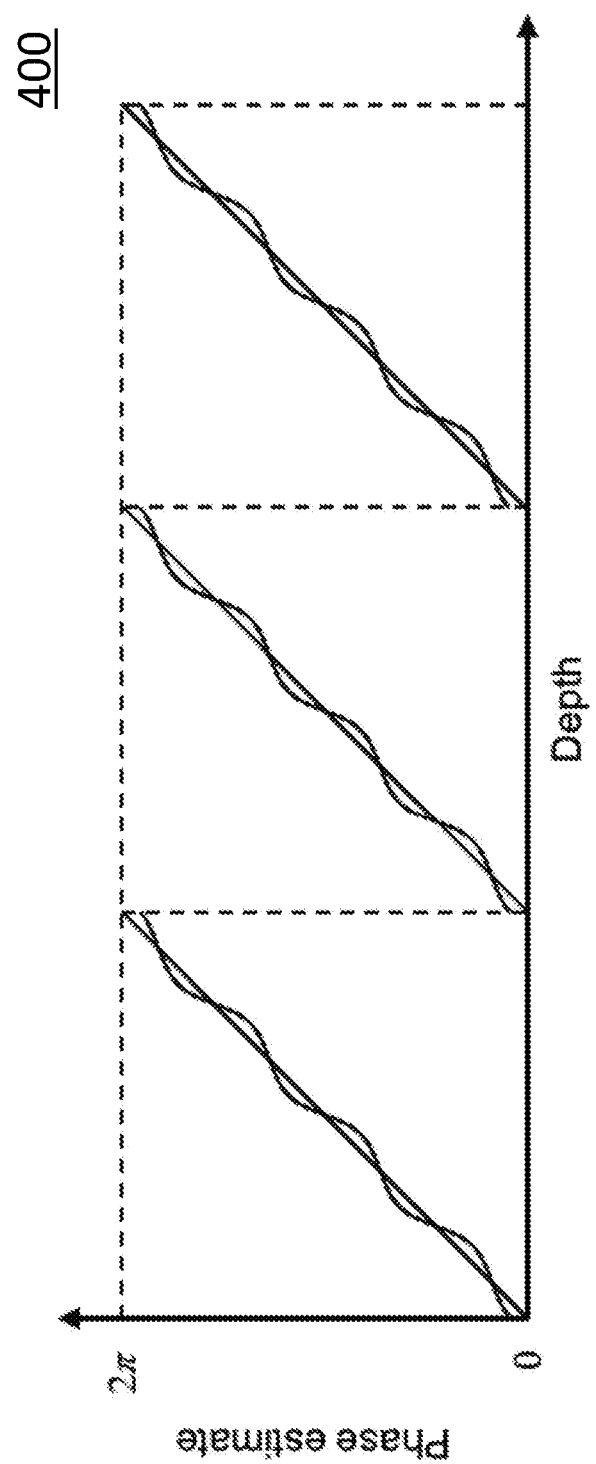
FIG. 4 shows an illustration of phase offset estimate as a function of depth with and without harmonics in the correlation function, according to some embodiments of the disclosure.

FIG. 4 shows an illustration of phase offset estimate as a function of depth with and without harmonics. The phase offset estimate without harmonics is represented by the straight dashed line on the graphs, and the phase offset estimate with harmonics is the wavy solid line.

Even order harmonics in the correlation function are easily cancelled by differential measurements of the form $$c_d(\tau) = c(\tau) - c\left(\tau - \frac{T}{2}\right),$$

and are therefore not a problem.

To cancel odd-order harmonics, the correlation function is sampled at closer intervals. For example, to cancel the non-linearity due to the $3^{rd}$ harmonic, the correlation function is sampled at intervals separated by $$\frac{T}{6}$$

as opposed to $$\frac{T}{4}$$

in the pure sinewave case. In this case, the phase estimate is given by the following equation (9):

$$\Phi = \text{atan}\left(\frac{\sqrt{3}\left(\left[c\left(\frac{T}{6}\right) - c\left(\frac{4T}{6}\right)\right] + \left[c\left(\frac{2T}{6}\right) - c\left(\frac{5T}{6}\right)\right]\right)}{2\left[c(0) - c\left(\frac{T}{2}\right)\right] + \left[c\left(\frac{T}{6}\right) - c\left(\frac{4T}{6}\right)\right] - \left[c\left(\frac{2T}{6}\right) - c\left(\frac{5T}{6}\right)\right]}\right) \quad (9)$$

The terms inside brackets in equation (9) correspond to differential measurements. Three differential measurements (six single-end measurements) are used to cancel the $3^{rd}$ harmonic in the estimation of the phase offset. Similar schemes using even more correlation samples can be devised to cancel higher odd-order harmonics. Harmonic cancellation comes at the price of a greater number of correlation samples, and therefore an increased number of exposure/readout phases.

Similar to the ideal case, an intensity estimate can be obtained using equation (10):

$$I = \sqrt{\left(\sqrt{3}\left(\left[c\left(\frac{T}{6}\right) - c\left(\frac{4T}{6}\right)\right] + \left[c\left(\frac{2T}{6}\right) - c\left(\frac{5T}{6}\right)\right]\right)\right)^2 + \left(\left[c(0) - c\left(\frac{T}{2}\right)\right] + \left[c\left(\frac{T}{6}\right) - c\left(\frac{4T}{6}\right)\right] - \left[c\left(\frac{2T}{6}\right) - c\left(\frac{5T}{6}\right)\right]\right)^2} \quad (10)$$

Simultaneous Spatial Correlation Sampling

As discussed above, multiple correlation samples per pixel are used to compute the phase estimate. The correlation samples (either single-ended or differential) are typically captured one after another (exposure, readout, exposure, readout, etc.). That technique uses multiple exposures and readouts to form a phase estimate (the number depends on the number of harmonics that are cancelled).

Figure 5:
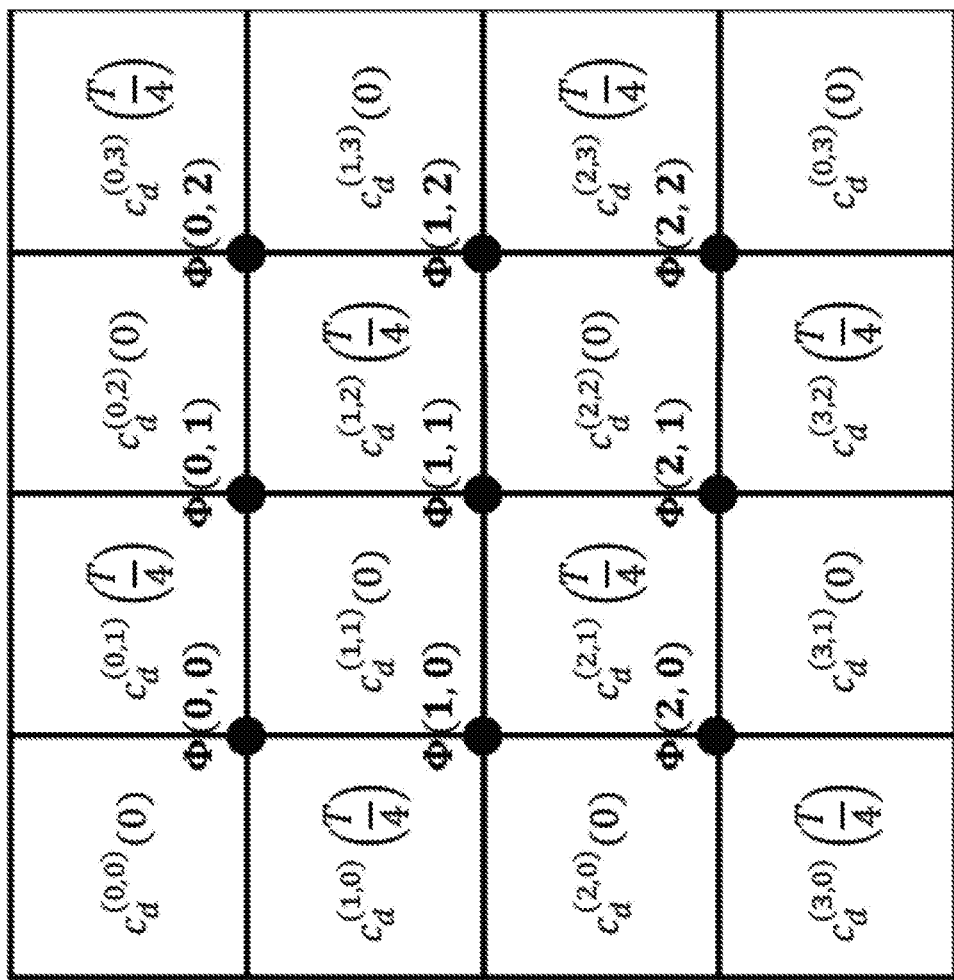
FIG. 5 shows an arrangement of multiple differential correlation measurements in one frame, according to some embodiments of the disclosure.

FIG. 5 shows an arrangement 500 of multiple differential correlation measurements in one frame, according to various embodiments of the disclosure. In particular, FIG. 5 shows an example of 2 correlation samples per phase offset estimation. The correlation measurement system shown in FIG. 5 is designed to reduce the number of exposure/readout phases, to reduce the power consumption of the system, and to reduce motion artifacts stemming from the fact that a scene might change from one exposure to another.

As shown in FIG. 5, a sample of the correlation function on different pixels is collected instead of a sample of the correlation function at different times. For example, when the signal is a pure sinewave, and two differential correlation samples (four single-ended samples) per pixel are used, the sensor array can be decomposed into a set of 2×2 sub-arrays.

In the differential case, pixel (0,0) and pixel (1,1) of the sub-array can collect $$c_d(0) = c(0) - c\left(\frac{T}{2}\right),$$

while pixel (0,1) and pixel (1,0) can collect $$c_d\left(\frac{T}{4}\right) = c\left(\frac{T}{4}\right) - c\left(\frac{3T}{4}\right).$$

This arrangement is shown in FIG. 5. In the single-ended case, we can have the following mapping:

$$\text{pixel}(0, 0) = c(0), \text{pixel}(0, 1) = c\left(\frac{T}{4}\right),$$

$$\text{pixel}(1, 0) = c\left(\frac{3T}{4}\right) \text{ and pixel}(1, 1) = c\left(\frac{T}{2}\right).$$

Thus, in one example, each pixel in a group of four pixels is associated with one correlation sample. In some examples, the correlation samples form a checkerboard pattern, with "white" squares being correlation samples with a phase of 0° (sample time 0), and "black" squares being correlation samples with a phase of 90°

(sample time $\frac{T}{2}$).

The phase offset at each pixel is calculated from its four neighboring pixels in a way similar to what's described in the previous section. The calculation is different depending on whether the pixel indexes add up to an even number or add to an odd number. For example:

$$\Phi(0,0) = -\text{atan}\left(\frac{c_d^{(1,0)}\left(\frac{T}{4}\right) + c_d^{(0,1)}\left(\frac{T}{4}\right)}{c_d^{(0,0)}(0) + c_d^{(1,1)}(0)}\right)$$

and $$\Phi(0,1) = -\text{atan}\left(\frac{c_d^{(0,1)}\left(\frac{T}{4}\right) + c_d^{(1,2)}\left(\frac{T}{4}\right)}{c_d^{(1,1)}(0) + c_d^{(0,2)}(0)}\right)$$

The technique described herein effectively decreases the spatial resolution of the array because the phase offset is estimated from multiple neighboring pixels.

Figure 6:
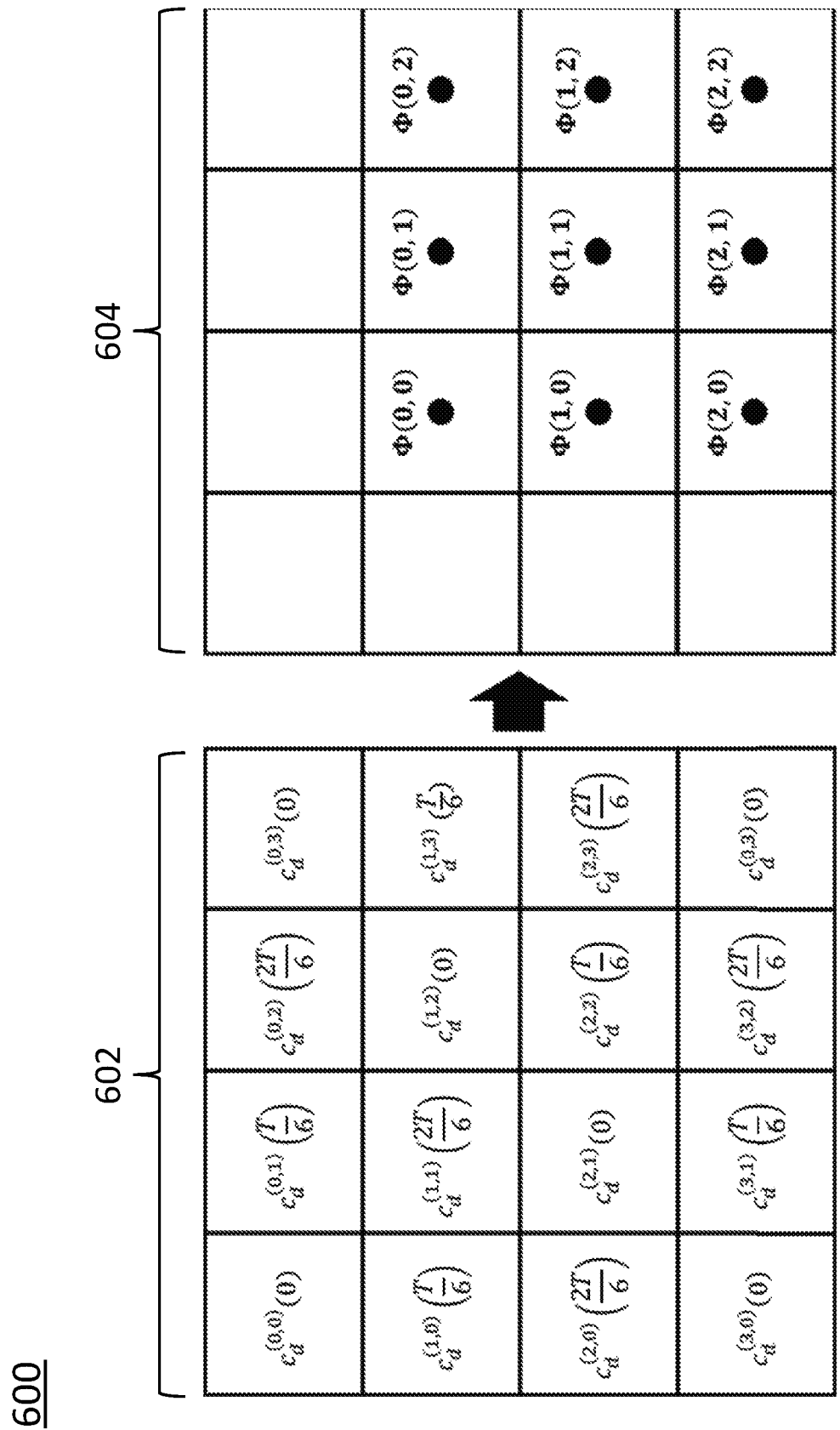
FIG. 6 shows an arrangement of multiple differential correlation measurements in one frame, according to some embodiments of the disclosure.

FIG. 6 shows an arrangement 600 of multiple differential correlation measurements in one frame 602. In particular, FIG. 6 shows an example 604 of three correlation samples per phase offset estimation.

It is possible to extend the idea to any number correlation samples. Below is an example for calculating the phase offset from three differential correlation samples (as described above). The pixel layout is shown in FIG. 6.

The phase offset at each output pixel is calculated from nine neighboring pixels. For example:

$$\Phi(0,0) = \text{atan}\left(\frac{\sqrt{3}(B+C)}{2A+B-C}\right)$$

where $$A = c_d^{(0,0)}(0) + c_d^{(1,2)}(0) + c_d^{(2,1)}(0)$$

$$B = c_d^{(0,1)}\left(\frac{T}{6}\right) + c_d^{(1,0)}\left(\frac{T}{6}\right) + c_d^{(2,2)}\left(\frac{T}{6}\right)$$

$$C = c_d^{(0,2)}\left(\frac{2T}{6}\right) + c_d^{(1,1)}\left(\frac{2T}{6}\right) + c_d^{(2,0)}\left(\frac{2T}{6}\right)$$

In various implementations, different sets of pixels are selected for correlation sampling. In one example, a column-based approach is used, wherein the pixels of a column are used for each correlation sample. Similarly, in another example, a row-based approach is used, wherein the pixels of a row are used for each correlation sample. In some examples, the mode of correlation sampling varies. In one example, a sensor system switches between two modes. In another example, a sensor system follows a pattern of different phases.

In some implementations, as described above, the pixels in a sensor array have different phases. Further, as described above, correlation sample times are related to correlation sample phase (phase=2πf×correlation sample time). In some examples, correlation sample phases have different pattern. For example, the correlation samples in a first field have a first selected phase, while the correlation samples in a second field have a second selected phase. In one example, the first and second fields are interleaved throughout a sensor array. In one example, the first and second fields form a checkerboard pattern in a pixel array. In various examples, the location of the first and second fields changes over time.

Correlation samples with different phases can be arranged throughout the sensor array in any selected pattern. In one example, the correlation samples in a first column have a first selected phase and the correlation samples in a second column have a second selected phase. In some examples, the pattern continues with a third column having correlation samples in the first selected phase, and a fourth column having correlation samples in the second selected phase. In other examples, a third column has correlation samples in a third selected phase. In some examples, a fourth column has correlation samples in a fourth selected phase. In some examples the pattern of the first, second, third, and fourth columns repeats in subsequent sets of four columns.

In some implementations, two or more patterns of correlation samples with different phases are rotated. In some examples, the patterns are rotated between fields of different illumination phases.

In some implementations, in a multiple frequency continuous wave spatial sampling solution, there are different patterns for different frequencies. In one example, 50 MHz fields include correlation samples having first and second phases, where a first set of correlation samples have the first selected phase and a second set of correlation samples have the second selected phase. Correlation samples of the first set are alternated with correlation samples of the second set in a checkerboard pattern. Additionally, 200 MHz fields include correlation samples having third and fourth phases, where a third set of correlation samples have the third selected phase and a fourth set of correlation samples have the fourth selected phase. Correlation samples of the third set are alternated with correlation samples of the fourth set in a striped pattern. In other examples, the correlation samples of one or more selected frequency have no pattern of phases.

According to some implementations, some patterns of correlation samples include one or more gaps having no data, and interpolation is used to fill the gaps with data. In particular, in some examples, interpolation is used to estimate a value for any gaps based on values of surrounding and/or nearby pixels. In some examples, interpolation is used to estimate a value for any gaps based on values of surrounding and/or nearby correlation samples. In various implementations, signal processing techniques are used for the interpolation calculations.

According to some implementations, the same pixel array is used in both a spatial correlation mode and in a non-spatial correlation mode. This allows a trade off between higher resolution and fewer motion artifacts. For example, in a spatial correlation mode, there are fewer motion artifacts, since the correlation is completed using a data from a single time point. A non-spatial correlation mode allows for higher resolution since no neighboring pixel data is incorporated in calculating phase offset.

Sensor Mode of Operation

Figure 7:
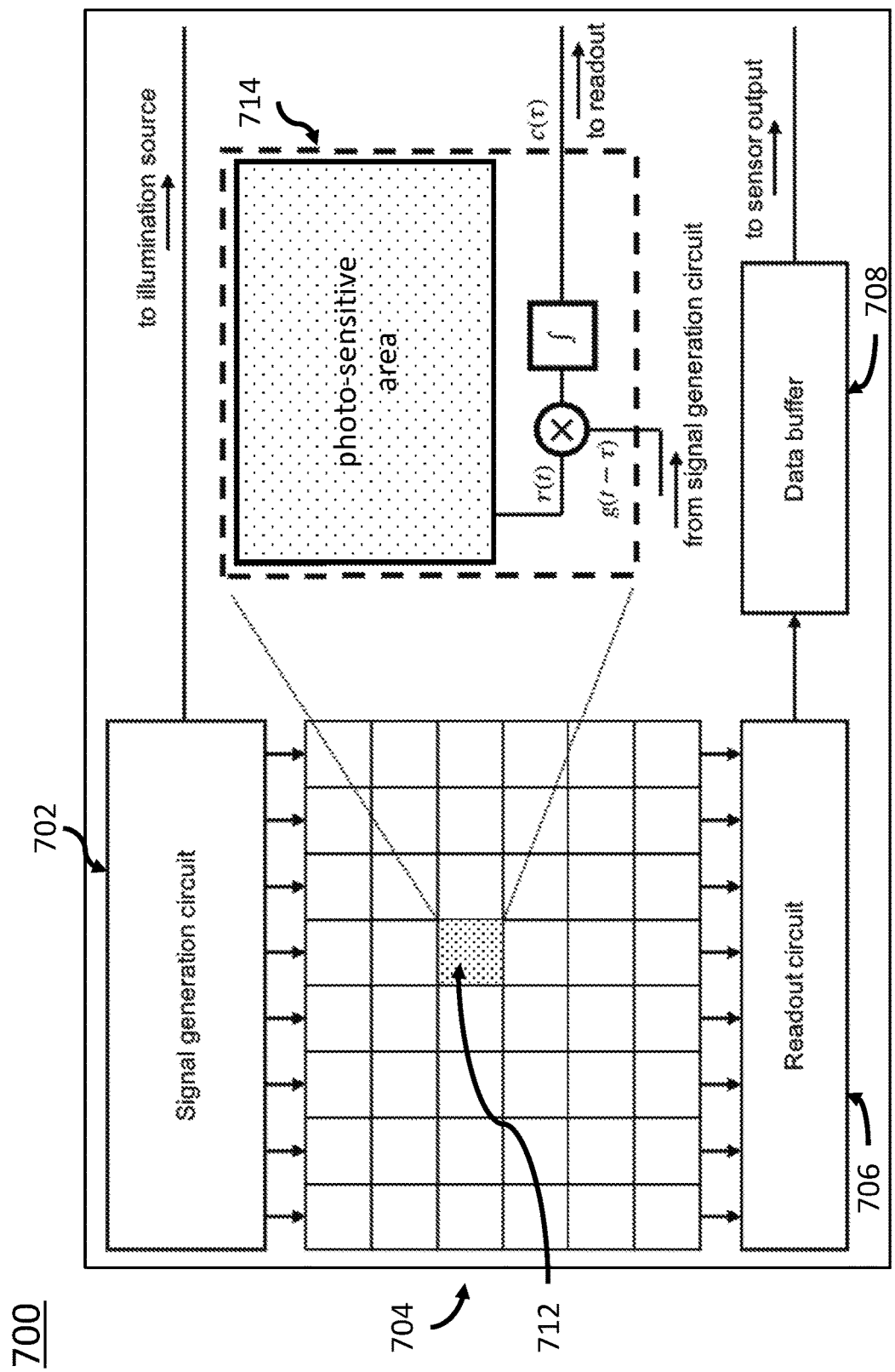
FIG. 7 shows a system for spatial correlation sampling, according to some embodiments of the disclosure.

FIG. 7 is an example model of a continuous-wave time-of-flight sensor 700, according to various embodiments of the disclosure. In particular, FIG. 7 shows a possible continuous-wave demodulating sensor architecture including a signal generation circuit 702, a sensor array 704, a readout circuit 706, a data buffer 708, and an output 710. The sensor array includes multiple elements such as element 712. Each element 712 includes a photo sensitive area 714 an input from the signal generation unit 716. Each element of the sensor array 704 produces a correlation sample and outputs the correlation sample to the readout circuit 706.

The signal generation circuit 702 outputs a signal to an illumination source, and also transmits the signal generation information to the elements of the sensor array 704. Referring to element 712 as an example of the elements of the sensor array 704, the element 712 uses signals received at the photo-sensitive area 714 and the input data from the signal generation circuit 702 to measure a phase offset and determine a correlation sample. The correlation sample is output to the readout circuit 706. The readout circuit 706 outputs data to the data buffer 708, which outputs the sensor output.

Exposure Phase

During the exposure, the light emitter emits intensity-modulated light towards the scene, and the pixels in the array 704 demodulate the returned light in order to measure the phase offset at each pixel. The pixels in the array 704 are driven by a common demodulation signal $g(t-\tau)$ that is phase synchronized with the signal $s(t)$ that modulates the emitter.

In practice, there is a phase offset between the signal that modulates the emitter and the demodulation signal that causes an offset in the phase offset estimate. The phase offset error can be calibrated out at manufacturing.

In some pixel architectures, such as photo-mixing device (PMD) pixels, the demodulation is performed in the analog domain with a special pixel structure. In other pixel architectures, such as Single-Photon Avalanche Detector (SPAD)-based pixels, the demodulation operation is performed in the digital domain.

The generation of the demodulation signals and the light emission are two major sources of energy consumption. The generation of the demodulation signals tends to consume an amount of energy that is proportional to the area of the sensor array 704. The power consumption of the emitter depends on its optical power and the driver efficiency. The optical power depends on the time-of-flight camera range specification.

Figure 8:
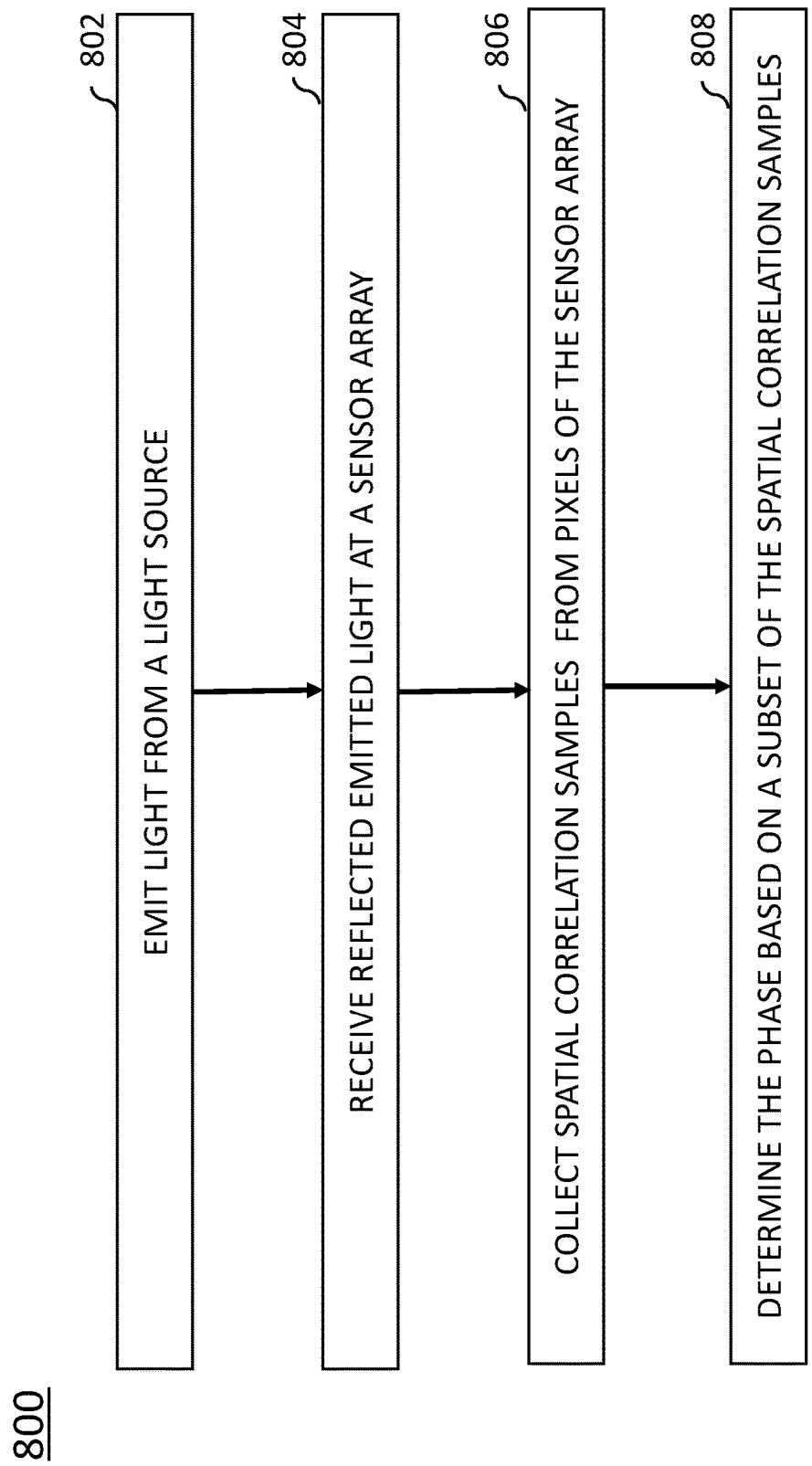
FIG. 8 shows a method for spatial correlation sampling, according to some embodiments of the disclosure.

FIG. 8 shows a method 800 for spatial correlation sampling, according to various embodiments of the disclosure. The method 800 can be used to estimate the phase of a continuous wave in an image processing system. The method 800 includes emitting light from a light source at step 802. The light is emitted during a first time interval. At step 804, reflected emitted light is received at a sensor array. The sensor array includes a plurality of pixels. The reflected emitted light includes emitted light that has reflected off an object in a scene. At step 806, spatial correlation samples are collected from at least a subset of the plurality of pixels. The spatial correlation samples are collected (or read out) to a readout circuit. At step 808, the phase is determined based on at least a subset of the plurality of spatial correlation samples. According to various examples, the spatial correlation samples are generated simultaneously at the pixels of the sensor array.

Readout Phase

The readout phase follows the exposure phase. During the readout phase, the emitter is turned off and the pixels are not demodulating the return light. The pixels values (sampled correlation function for each pixel) are read out (typically one row at a time) by the readout circuit 706. If the demodulation operation is performed in the analog domain, the correlation samples for each pixel are converted to a digital value. Conversion to digital value is typically done by multiple analog-to-digital converters (ADCs) that can be shared by multiple pixels in the array 704. In one example, there is one ADC per row of the sensor array 704. The data from the readout circuit 706 is buffered in the data buffer 708 and streamed out of the time-of-flight sensor 700.

Possible Implementations

The proposed technique can be implemented in a sensor such as the sensor 700 described in FIG. 7 by having the signal generation circuit 702 generate different demodulation signals $g(t-\tau)$ for different pixels in the array 704. The routing of the signal to each pixel can either be fixed to reduce circuit complexity, or programmable to allow for different phase configurations.

SELECT EXAMPLES

Example 1 provides an image processing system for estimating a phase of continuous waves, including a light source configured to emit light during a first time interval, an sensor array comprising a plurality of pixels for receiving reflected emitted light, and a processor configured to collect a plurality of spatial correlation samples simultaneously from at least a subset of the plurality of pixels, and determine the phase based on a subset of the plurality of spatial correlation samples.

Example 2 provides an image processing system according to example 1, including a signal generation circuit for generating a modulating signal for modulating intensity of the light emitted from the light source.

Example 3 provides an image processing system according to examples 1-2, where the plurality of pixels are configured to demodulate the reflected emitted light.

Example 4 provides an image processing system according to one or more of the preceding examples, where respective pixels of the plurality of pixels are configured to determine phase offset of the reflected emitted light.

Example 5 provides an image processing system according to one or more of the preceding examples, including a readout circuit configured to read out pixel values for respective ones of the plurality of pixels.

Example 6 provides an image processing system according to one or more of the preceding examples where pixel values comprise sampled correlation function values for respective pixels of the plurality of pixels.

Example 7 provides an image processing system according to one or more of the preceding examples, including a data buffer for storing pixel values.

Example 8 provides an image processing system according to one or more of the preceding examples, where the subset of the plurality of spatial correlation samples correspond to a two-by-two sub-array of the plurality of pixels.

Example 9 provides an image processing system according to one or more of the preceding examples, where the subset of the plurality of spatial correlation samples correspond to a three-by-three sub-array of the plurality of pixels.

Example 10 provides a method for estimating a phase of continuous waves in an image processing system including emitting light from a light source during a first time interval, receiving reflected emitted light at a sensor array comprising a plurality of pixels, collecting a plurality of spatial correlation samples from at least a subset of the plurality of pixels, and determining the phase based on a subset of the plurality of spatial correlation samples.

Example 11 provides a method according to one or more of the preceding examples, including generating a modulating signal for modulating intensity of the light emitted from the light source.

Example 12 provides a method according to one or more of the preceding examples, including demodulating the reflected emitted light.

Example 13 provides a method according to one or more of the preceding examples, including determining phase offset of the reflected emitted light at respective pixels of the plurality of pixels.

Example 14 provides a method according to one or more of the preceding examples, including outputting pixel values for respective ones of the plurality of pixels to a readout circuit.

Example 15 provides a method according to one or more of the preceding examples, where pixel values comprise sampled spatial correlation function values for respective pixels of the plurality of pixels.

Example 16 provides a method according to one or more of the preceding examples, where outputting pixel values occurs during a second time interval, wherein during the second time interval the light source is deactivated.

Example 17 provides a camera apparatus for estimating a phase of continuous waves, including a light source configured to emit light, an sensor array comprising a plurality of pixels for receiving reflected emitted light, means for collecting a plurality of spatial correlation samples simultaneously from at least a subset of the plurality of pixels, and means for determining the phase based on a subset of the plurality of spatial correlation samples.

Example 18 provides a camera apparatus according to one or more of the preceding examples, including a signal generation circuit for generating a modulating signal for modulating intensity of the light emitted from the light source.

Example 19 provides a camera apparatus according to one or more of the preceding examples, where respective pixels of the plurality of pixels are configured to determine phase offset of the reflected emitted light.

Example 20 provides a camera apparatus according to one or more of the preceding examples, including a readout circuit configured to read out pixel values for respective ones of the plurality of pixels.

Variations and Implementations

Applicant has recognized and appreciated that distance sensing may be performed by an imaging device with a higher power efficiency by emitting illumination light in only some, not all, cases in which a distance determination is desired. In those cases, in which illumination light is not emitted by the device, image analysis techniques may be used to estimate distances by comparing 2D images captured by the imaging device and detecting how an object or objects in those images change over time.

According to some embodiments, distances previously determined when illumination light was produced and captured may be used as a reference to aid in estimation of distance using 2D image analysis techniques. For example, illumination light may be emitted periodically to periodically determine distances, and in between those emissions image analysis may be performed to determine distances (e.g., using the previously-determined distances obtained using illumination light as a reference point).

According to some embodiments, a decision of whether to emit illumination light (to determine distances by collecting the reflected illumination light) may be based on an analysis of 2D images. The analysis may determine how accurate an estimation of distance will be based on one or more 2D images, so that when the accuracy falls below an acceptable threshold, a decision may be made to obtain a more accurate determination of distance using illumination light. In this manner, illumination light may be emitted only when a 2D image analysis does not produce acceptably accurate distance measurements, which may reduce the frequency with which the illumination light is emitted, thereby reducing power usage.

While aspects of the present disclosure may be used in any suitable imaging device, there may be particular advantages to applying such aspects within imaging devices that capture light during a plurality of frames, such as in video capture. Some imaging devices may be configured to ultimately preserve a single image yet may capture images a number of times prior to and/or after the image device has been activated to preserve the single image (e.g., devices configured to display a scene prior to capture of a single image for purposes of previewing the still image, and/or devices configured to capture a plurality of images when activated to capture a single image so that a single image can be selected and/or synthesized from the plurality of images). For the purposes of the discussion herein, a "frame" is considered to be applicable to both image capture during: (i) video capture; and (ii) still image capture where multiple images are registered in a device during the still image capture process (including, but not limited to, those examples above).

According to some embodiments, determining whether to emit illumination light based on an analysis of a 2D image may be performed in the same frame during which the 2D image was captured. Making the determination within the same frame may ensure that, in the case it is determined that illumination light is not to be emitted, a 2D image may be captured during the subsequent frame without there being an interim frame in which the determination is be made. Accordingly, the imaging device may operate efficiently by capturing an image during each frame. According to some embodiments, once it is determined that illumination light is to be emitted, the illumination light is emitted during the same frame during which the determination was made. Alternatively, if there is insufficient time during a frame to capture a 2D image, determine whether to emit illumination light and also emit the illumination light (e.g., because the imaging device does not have the processing capacity to perform all these steps within the frame because the frame time is very short and/or due to processing limitations of the device), the emission of illumination light may occur in a subsequent frame.

Following below are more detailed descriptions of various concepts related to, and embodiments of, techniques of distance sensing. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Figure 9:
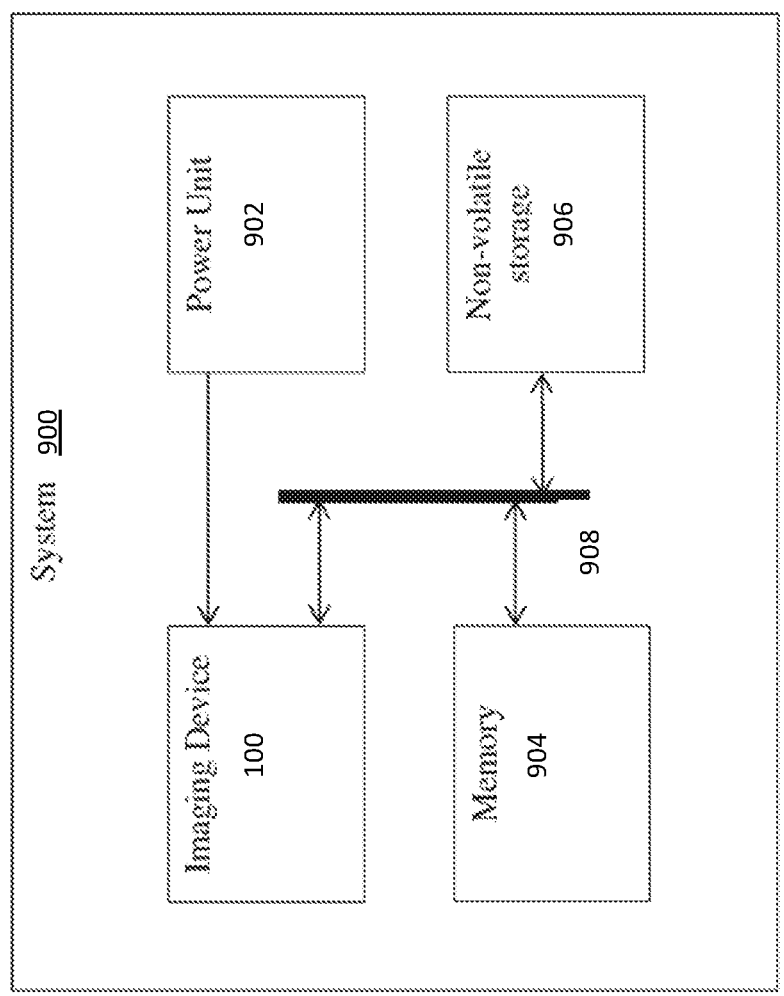
FIG. 9 illustrates an example of system incorporating an imaging device of the type described herein.

FIG. 9 illustrates an example of system incorporating an imaging device of the type described herein. An illustrative implementation of a system 900 which may incorporate an imaging device of the types described herein and shown in FIG. 1. The system 900 includes the imaging device 100 of FIG. 1, although imaging devices according to alternative embodiments described herein may alternatively be included. A power unit 902 may be provided to power the imaging device 100, along with potentially power other components of the system. The power unit 902 may be a battery in some embodiments, such as a battery typically used in mobile phones, tablets, and other consumer electronics products. As has been described, in some embodiments the imaging device 100 may provide low power operation, and thus may facilitate the use of a low power battery as the power unit 902. However, the power unit 902 is not limited to being a battery, nor is it limited to a particular type of battery in all embodiments.

The system 900 further comprises a memory 904 and a non-volatile storage 906. Those components may be communicatively coupled to the imaging device 100 in any suitable manner, such as via a shared communication link 908. The shared communication link 908 may be a bus or other suitable connection. The memory 904 and/or non-volatile storage 906 may store processor-executable instructions for controlling operation of the imaging device 100, and/or data captured by the imaging device 100. In connection with techniques for distance sensing as described herein, code used to, for example, signal an illumination light source to produce one or more light pulses, to open and/or close a shutter of an image sensor, read out pixels of an image sensor, perform distance calculations based on collected illumination light, etc. may be stored on one or more of memory 904 or non-volatile storage 906. Processor 107 may execute any such code to provide any techniques for distance sensing as described herein. Memory 904 may store data representative of 2D and/or 3D images captured by imaging device 100. The memory 904 and/or non-volatile storage 906 may be non-transitory memory in at least some embodiments.

Figure 10:
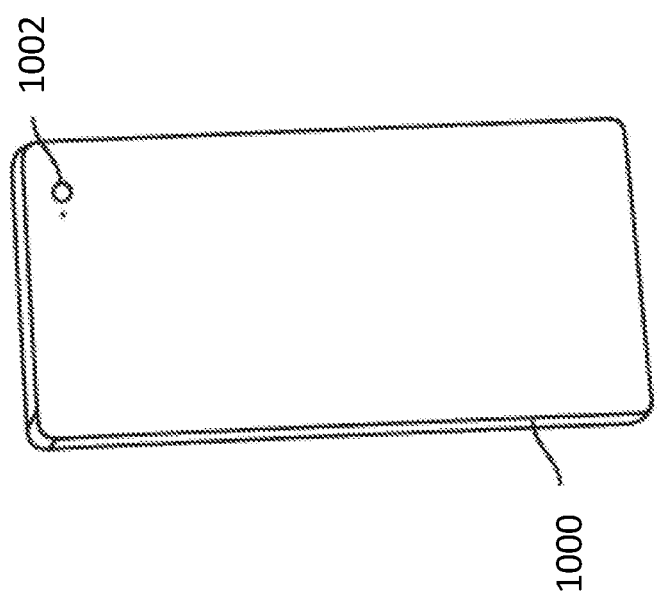
FIG. 10 illustrates a mobile device incorporating an imaging device of the types described herein.

The imaging systems described herein may be used in various applications, some examples of which are described in connection with FIGS. 10-12. A first example is that of a mobile device, such as a smartphone, tablet computer, smartwatch, or other mobile device. The imaging systems of the type described herein, such as the imaging device 100 or system 1000, may be used as a camera component of the mobile device. FIG. 10 illustrates a mobile device 1000 incorporating an imaging device of the types described herein.

The mobile phone 1000 includes a camera 1002 which may be an imaging device of the types described herein for capturing and generating 3D images, such as imaging device 100. The use of imaging device 100 as camera 1002 may be facilitated by low power consumption operation, such as the manners of operation described herein in connection with the imaging devices according to aspects of the present application. Mobile devices, such as mobile phone 1000, typically operate from battery power, and thus components which consume substantial power can be impractical for use within such devices. Imaging devices of the types described herein, by contrast, may be deployed within such devices in a power efficient manner.

Figure 11:
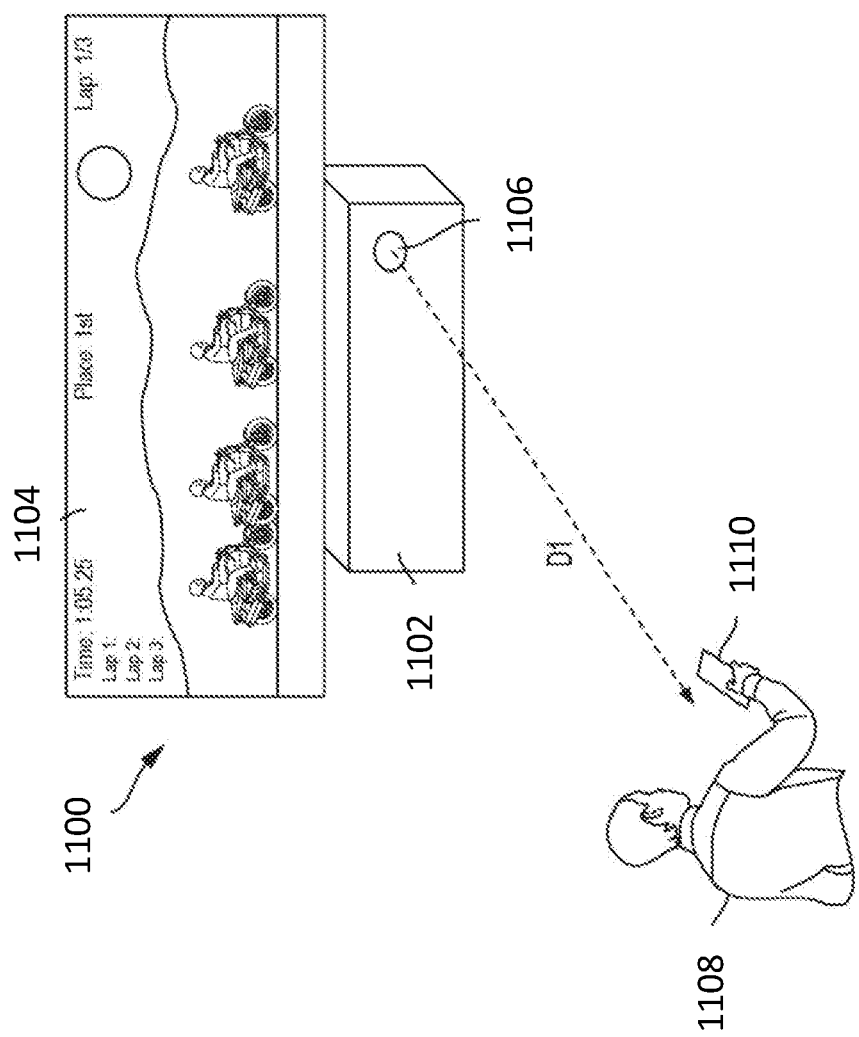
FIG. 11 illustrates a gaming console incorporating an imaging device of the types described herein.

FIG. 11 illustrates an entertainment system 1100 implementing an imaging system of the types described herein. The entertainment system 1100 includes a console 1102 and display 1104. The console may be a video gaming console configured to generate images of a video game on the display 1104, and may include a camera 1106. The camera 1106 may be an imaging system of the types described herein configured to capture 3D images, such as imaging device 100. In the example of FIG. 11, a user 1108 may interact with the entertainment system via a controller 1110, for example to play a video game. The camera 1106 may capture images of the user and/or controller, and may determine a distance D1 to the user. The distance information may be used to generate a 3D image for display on the display 1104 or for control of some other aspect of the entertainment system. For example, the user 1102 may control the entertainment system with hand gestures, and the gestures may be determined at least in part through capturing distance information D1.

Imaging systems of the types described herein may also be employed in robotics. FIG. 12 illustrates an example of a robot 1202 with an imaging system 1204. The robot may be mobile and the information collected by imaging system 1204 may be used to assist in navigation and/or motor control of the robot. The imaging system 1204 may be of the types described herein, for example being the system or imaging device 100. Mobile robots are typically powered by batteries, and thus imaging systems of the types described herein which may operate at relatively low power according to at least some of the described embodiments may facilitate their integration with the robot.

Figure 12:
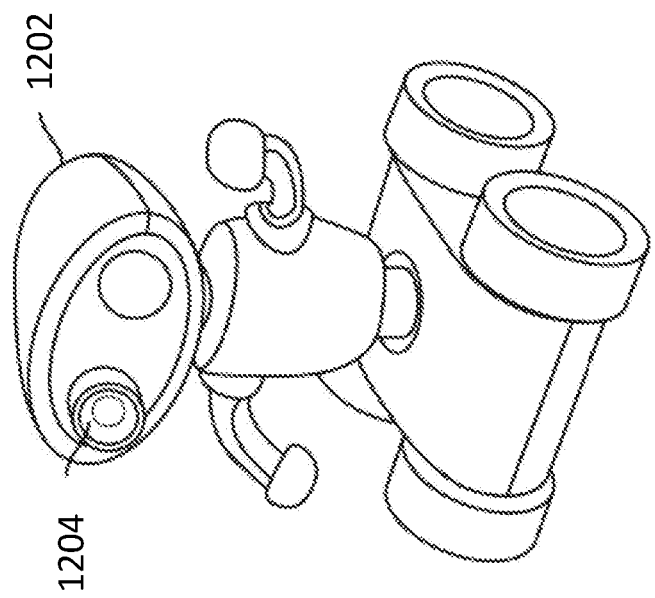
FIG. 12 illustrates a robot incorporating an imaging device of the types described herein.

Examples of uses of the technology described herein beyond those shown in FIGS. 10-12 are also possible. For example, automobiles and security cameras may implement 3D imaging devices of the types described herein.

The phrase "and/or," as used herein in the specification and in the claims, should be understood to mean "either or both" of the elements so conjoined, i.e., elements that are conjunctively present in some cases and disjunctively present in other cases. The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In some embodiments, the imaging device can take measurements from a scene using the imaging sensor. The term "measurements" can include capturing two-dimensional images and depth images (e.g., depth information that can be used to construct a depth map). The term "two dimensional images" includes any images that are not depth images, such as color (RGB) images, greyscale images, infrared images, other conventional images, etc.

Various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) or a computer readable storage device (which may include the foregoing examples) encoded with one or more programs that, when executed on one or more computers or other processors, implement some of the various embodiments of the present application.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be open-ended, i.e., to mean including but not limited to. The transitional phrases "consisting of" and "consisting essentially of" shall be closed or semi-closed transitional phrases, respectively.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended example and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods. In this respect, various inventive concepts may be embodied as a computer readable storage medium or multiple computer readable storage media (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. An image processing system for estimating a phase of continuous waves, comprising:
    a light source configured to emit light during a first time interval;
    a sensor array comprising a plurality of pixels for receiving reflected emitted light; and
    a processor configured to:
        collect a first spatial correlation sample at a first pixel and a second spatial correlation sample at a second pixel, wherein the first and second spatial correlation samples are collected simultaneously, and
        determine the phase at a selected pixel based on the simultaneously-collected first and second spatial correlation samples from the first and second pixels.

2. The image processing system of claim 1, further comprising a signal generation circuit for generating a modulating signal for modulating intensity of the light emitted from the light source.

3. The image processing system of claim 2, wherein the plurality of pixels are configured to demodulate the reflected emitted light.

4. The image processing system of claim 3, wherein respective pixels of the plurality of pixels are configured to determine phase offset of the reflected emitted light.

5. The image processing system of claim 1, further comprising a readout circuit configured to read out pixel values for respective ones of the plurality of pixels.

6. The image processing system of claim 5, wherein pixel values comprise sampled correlation function values for respective pixels of the plurality of pixels.

7. The image processing system of claim 5, further comprising a data buffer for storing pixel values.

8. The image processing system of claim 1, wherein the first and second pixels are part of a two-by-two sub-array of the plurality of pixels, and wherein the first phase is further based on simultaneously-collected third and fourth spatial correlation samples from the sub-array pixels.

9. The image processing system of claim 1, wherein the first and second pixels are part of a three-by-three sub-array of the plurality of pixels, and wherein the first phase is further based on additional simultaneously-collected sub-array spatial correlation samples from sub-array pixels.

10. A method for estimating a phase of continuous waves in an image processing system, comprising:
    emitting light from a light source during a first time interval;
    receiving reflected emitted light at a sensor array comprising a plurality of pixels;
    collecting a first spatial correlation sample at a first pixel and a second spatial correlation sample at a second pixel, the first and second spatial correlation samples are collected simultaneously; and
    determining the phase at a selected pixel based on the simultaneously-collected first and second spatial correlation samples from the first and second pixels.

11. The method of claim 10, further comprising generating a modulating signal for modulating intensity of the light emitted from the light source.

12. The method of claim 10, further comprising demodulating the reflected emitted light.

13. The method of claim 12, further comprising determining phase offset of the reflected emitted light at respective pixels of the plurality of pixels.

14. The method of claim 10, further comprising outputting pixel values for respective ones of the plurality of pixels to a readout circuit.

15. The method of claim 14, wherein pixel values comprise sampled spatial correlation function values for respective pixels of the plurality of pixels.

16. The method of claim 14, wherein outputting pixel values occurs during a second time interval, wherein during the second time interval the light source is deactivated.

17. A camera apparatus for estimating a phase of continuous waves, comprising:
    a light source configured to emit light;
    an sensor array comprising a plurality of pixels for receiving reflected emitted light; and means for collecting a first spatial correlation sample at a first pixel and a second spatial correlation sample at a second pixel, wherein the first and second spatial correlation samples are collected simultaneously; and a processor configured to determine a first phase at a selected pixel based on the simultaneously-collected first and second spatial correlation samples from the first and second pixels.

18. The camera apparatus of claim 17, further comprising a signal generation circuit for generating a modulating signal for modulating intensity of the light emitted from the light source.

19. The camera apparatus of claim 17, wherein respective pixels of the plurality of pixels are configured to determine phase offset of the reflected emitted light.

20. The camera apparatus of claim 17, wherein the first and second pixels are adjacent to the selected pixel.

* * * * *